(12) United States Patent
Milillo et al.

(10) Patent No.: US 6,457,109 B1
(45) Date of Patent: Sep. 24, 2002

(54) METHOD AND APPARATUS FOR COPYING DATA FROM ONE STORAGE SYSTEM TO ANOTHER STORAGE SYSTEM

(75) Inventors: Michael Steven Milillo, Louisville; David G. Hostetter, Boulder; Michael S. Kelly, Arvada; Christopher J. West, Boulder, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/641,671

(22) Filed: Aug. 18, 2000

(51) Int. Cl.[7] .............................................. G06F 12/02
(52) U.S. Cl. ............................ 711/162; 711/161; 714/6
(58) Field of Search ............................... 711/161, 162; 714/6

(56) References Cited

U.S. PATENT DOCUMENTS

| | | | | |
|---|---|---|---|---|
| 5,155,845 A | * | 10/1992 | Beal et al. .......................... 714/6 |
| 5,555,371 A | * | 9/1996 | Duyanovich et al. .......... 711/162 |
| 5,623,599 A | * | 4/1997 | Shomler ............................ 714/18 |
| 5,692,155 A | * | 11/1997 | Iskiyan et al. .................. 711/162 |
| 5,835,954 A | * | 11/1998 | Duyanovich et al. .......... 711/162 |
| 6,131,148 A | * | 10/2000 | West et al. ...................... 711/162 |

* cited by examiner

Primary Examiner—Reba I. Elmore
(74) Attorney, Agent, or Firm—Carstens, Yee & Cahoon, L.L.P.

(57) ABSTRACT

A method and apparatus in a data processing system for copying data. A request is received to copy data from a first storage system to second storage system, wherein the request identifies a source volume on the first storage system and a target volume on the second storage system and wherein data is located on a first source volume in the first storage system. Data is transferred to a second source volume in the first storage system. A pair is automatically established between the second source volume and the target volume. The data for the request is copied from the second source volume to the target volume after the pair has been automatically established. The pair is terminated after the data has been copied to the target volume. The requester originating the request is notified of the result of the copy operation.

29 Claims, 6 Drawing Sheets

METHOD AND APPARATUS FOR COPYING DATA FROM ONE STORAGE SYSTEM TO ANOTHER STORAGE SYSTEM

BACKGROUND OF THE INVENTION

1. Technical Field

The present invention relates generally to an improved data processing system and in particular to a method and apparatus for transferring data. Still more particularly, the present invention provides a method and apparatus for copying data from one storage system to another storage system.

2. Description of Related Art

With increasingly large amounts of data being handled in data processing systems, storage systems, such as disk storage subsystems are being used to store data. Some organizations rely heavily on data and quick access to the data. Disasters caused by environmental conditions, user errors, or application errors may occur in which access to the data is lost for some period of time. Mirroring or copying data to a secondary storage system from primary storage system is currently employed to minimize the time in which access to data is lost due to a disaster.

Peer-to-peer remote copy (PPRC) is a synchronous copy mechanism that creates a copy of data at a remote or secondary storage system. This copy, at the secondary storage, is kept current with the data located at the primary storage system. In other words, a copy of the data located at a secondary storage system is kept in synch with the data at the primary storage system, as observed by the user of the data. Volume pairs are designated in which a volume in a primary system is paired with a volume in the secondary storage system. With a PPRC system, a PPRC data copy to the recovery or secondary storage system occurs synchronously from the host point of view with write operations to volumes in the primary storage system. With presently available techniques for copying data, multiple disks in a primary storage system contend for paths connecting the primary storage system to the secondary storage system. When data is written from a host to the primary storage system, the data written to a particular volume is also written to a corresponding volume in the secondary storage system using a path to the secondary storage system.

In using PPRC, a user is required to establish pairs of volumes and to terminate these pairs when recovery of data occurs. This establishment and tearing down of pairs assumes that it occurs infrequently and that a pair of volumes will persist for a relatively long time.

Although PPRC has been used to synchronize data between various subsystems on a write by write basis, another popular use of PPRC is to use this system for copying data to a remote storage system without keeping the copy made to the remote storage system in synchronization with the primary volume on the primary storage system. Currently, copying data through a PPRC storage system requires operator intensive actions to set up a PPRC pair, monitor the progress of the copy, and terminate the pair when the copy is complete. Further, the host data processing system is required to have unit control blocks (UCB) for performing the copy. The required user actions make copying from one storage system to another storage system time intensive because of the number of actions required from the user. Further, this one time copy process without synchronization also requires additional resources.

Therefore, it would be advantageous to have an improved method and apparatus for copying data from one storage system to another storage system.

SUMMARY OF THE INVENTION

The present invention provides a method and apparatus in a data processing system for copying data. A request is received to copy data from a first storage system to second storage system, wherein the request identifies a source volume on the first storage system and a target volume on the second storage system and wherein data is located on a first source volume in the first storage system. Data is transferred to a second source volume in the first storage system. A pair is automatically established between the second source volume and the target volume. The data for the request is copied from the second source volume to the target volume after the pair has been established. The pair is automatically terminated after the data has been copied to the target volume. The requester originating the request is notified of the result of the copy operation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
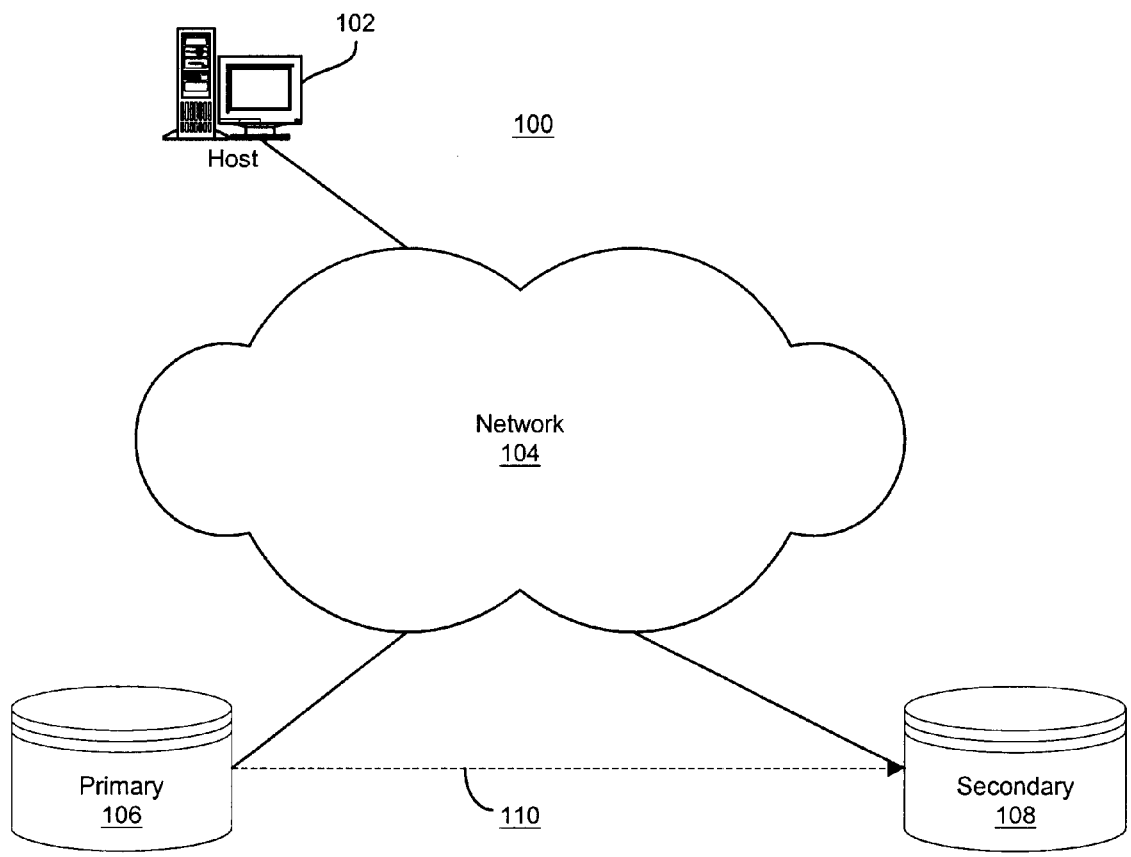
FIG. 1 is a diagram of a data processing system in which the present invention may be implemented.

With reference now to the figures and with reference in particular to FIG. 1, a diagram of a data processing system is depicted in which the present invention may be implemented. Data processing system 100 includes a host 102, which has a connection to network 104. Data may be stored by host 102 in primary storage system 106. Data written to primary storage system 106 is copied to secondary system 108 in these examples. The copy process is used to create a copy of the data in primary storage system 106 in secondary storage system 108. In these examples, the copy process is a peer-to-peer remote copy (PPRC) mechanism. In such a system, a write made by host 102 is considered complete only after the data written to primary storage system 106 also is written to secondary system 108.

In these examples, host 102 may take various forms, such as a server on a network, a Web server on the Internet, or a mainframe computer. Primary storage system 106 and secondary storage system 108 are disk systems in these examples. Specifically, primary storage system 106 and secondary storage system 108 are each set up as shared virtual arrays to increase the flexibility and manageability of data stored within these systems. Network 104 may take various forms, such as, for example, a local area network (LAN), a wide area network (WAN), the Internet, or an intranet. Network 104 contains various links, such as, for example, fiber optic links, packet switched communication links, enterprise systems connection (ESCON) fibers, small computer system interface (SCSI) cable, and wireless communication links. FIG. 1 is intended as an example of a data processing system in which the present invention may be implemented and not as an architectural limitation to the present invention. For example, host 102 and primary storage system 106 may be connected directly while primary storage system 106 and secondary storage system 108 may be connected by a LAN or WAN. Further, primary storage system 106 and secondary storage system 108 may be connected to each other by a direct connection 110, rather than through network 104.

The present invention allows for data from a volume located within primary storage system 106 to be sent to a volume within secondary storage system 108 using a single command, referred to as a global snap command. This command causes a copy operation to occur internally from the source volume to an intermediate volume in primary storage system 106. Then, a volume pair is established between the intermediate volume in primary storage system 106 and the target volume in secondary storage system 108. The mechanism copies the data and then terminates the pair. This mechanism removes the need for a user to set up the volume pair, monitor copying of the data, and terminating the volume pair after the data has been copied.

Figure 2:
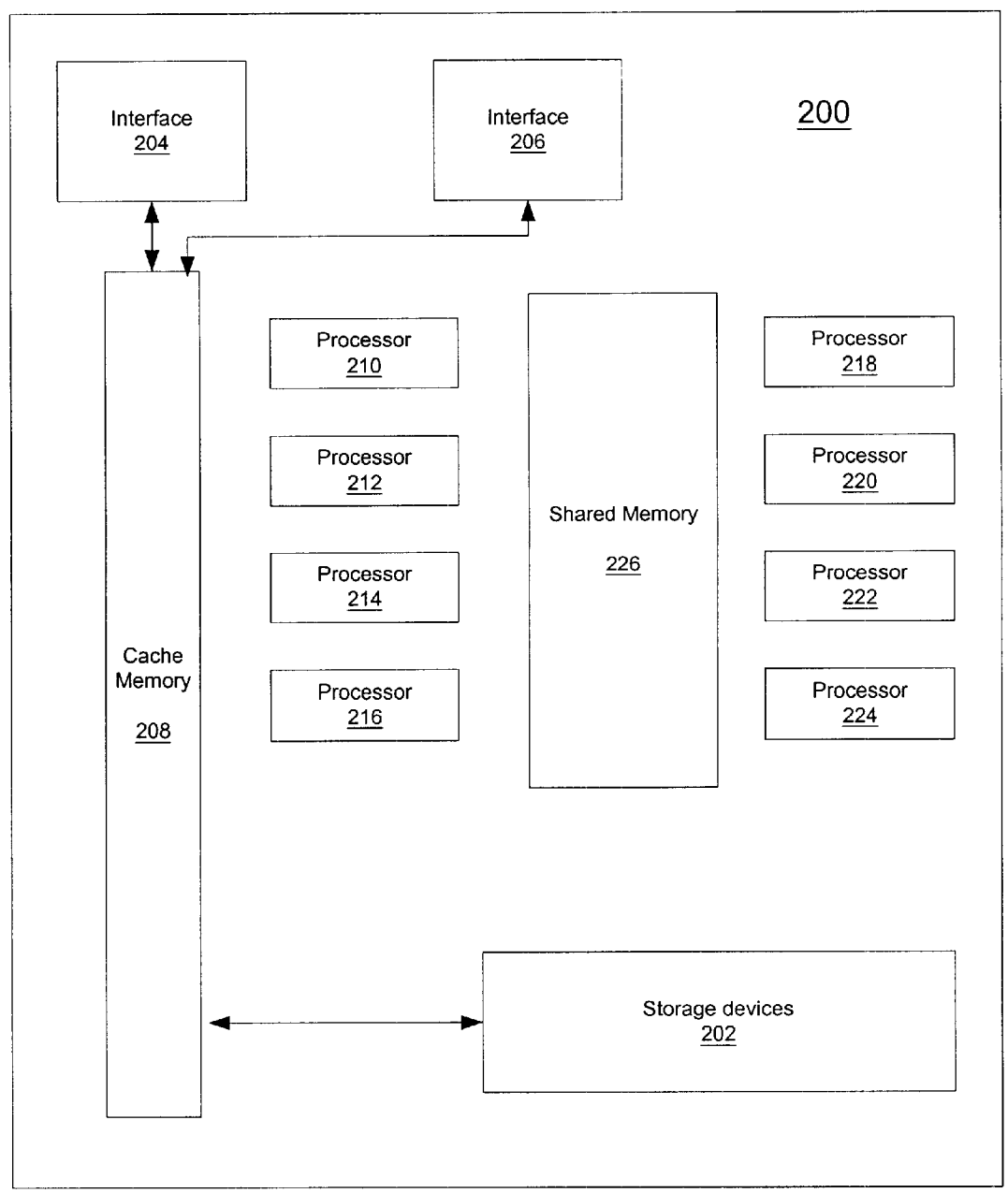
FIG. 2 is a block diagram of a storage system in accordance with a preferred embodiment of the present invention.

Turning next to FIG. 2, a block diagram of a storage system is depicted in accordance with a preferred embodiment of the present invention. Storage system 200 may be used to implement primary storage system 106 or secondary storage system 108 in FIG. 1. As illustrated in FIG. 2, storage system 200 includes storage devices 202, interface 204, interface 206, cache memory 208, processors 210–224, and shared memory 226.

Interfaces 204 and 206 in storage system 200 provide a communication gateway through which communication between a data processing system and storage system 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage system 200 is a shared virtual array. Storage system 200 is a virtual storage system in that each physical storage device in storage system 200 may be represented to a data processing system, such as host 100 in FIG. 1, as a number of virtual devices. In this example, storage devices 202 are a set of disk drives set up as a redundant array of inexpensive disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and manage the reading and writing of data to storage devices 202. In this example, processors 210–224 are used to write data addressed using a virtual volume to the physical storage devices. For example, a block of data, such as a track in a virtual volume, may be received by interface 204 for storage. A track is a storage channel on disk, tape, or other storage media. On disks, tracks are concentric circles (hard and floppy disks) or spirals (CDs and videodiscs). On tapes, tracks are arranged in parallel lines. The format of a track is determined by the specific drive in which the track is used. On magnetic devices, bits are used to form tracks and are recorded as reversals of polarity in the magnetic surface. On CDs, the bits are recorded as physical pits under a clear, protective layer. This data is placed in cache memory 208. Processors 210–224 will write the track of data for this volume into a corresponding virtual volume set up using storage devices 202.

The present invention provides a method, apparatus, and instructions for transferring data between two storage systems. The mechanism of the present invention may be implemented in disk systems using peer-to-peer remote copy (PPRC). When using a PPRC system, a user is required to establish a connection between the source storage system and the destination storage system. This connection is established using an established path command in these examples. The mechanism of the present invention allows a user to issue a global snap command with parameters that avoid the overhead associated with creating and monitoring the PPRC pairs. By using this command, the mechanism automatically sends the data from the primary volume to an intermediate volume in the source storage system. This intermediate volume is used to perform the actual data transfer, leaving the primary volume free for use. The mechanism of the present invention also establishes a volume pair between the intermediate volume on the source storage system and the target volume on the target storage system. The data is transferred between these two volumes and then the pair is terminated with the data transfer has completed. All of these actions occur without using user intervention. The user is only required to use the global snap command.

The illustration of storage system 200 in FIG. 2 is not intended to imply architectural limitations of the present invention. Storage system 200 may be implemented using a number of available storage systems modified to provide a pair of volumes used to handle data transfer between the other volumes pairs in a primary storage system and a secondary storage system. For example, a Shared Virtual Array (9393-6) system available from Storage Technology Corporation located in Louisville, Colo. may be used to implement the present invention.

In these examples, the global snap command parameters are P, P', S and S'. S' is an optional parameter in these examples. The parameter P is a source extent for the global snap command. This parameter may include, for example, a device, a cylinder, and a head identifier. This parameter defines the data that is to be copied from the device on the source storage system. The data may be defined in various ways, such as a single file on a volume, multiple files on a volume, or an entire volume. Additionally, the global snap command parameters may define multiple extents for copying data. The parameter P' is the target extent, which may be in the form of a device, a cylinder, and head. This parameter defines the destination for the snap copy operation on the source storage system. The extent in these examples identifies a starting track, starting cylinder, and starting head along with an ending track, ending cylinder, and an ending head to identify the data to be copied. The parameter S is the target device, if the parameter S' is not used, or the target extent of the device for the final destination on the target storage system. The parameter S' is an optional intermediate device that is used if the device identified by the parameter S is to be kept online or if not all of the volume in the device is to be modified. The following is an example of a global snap copy command: GSC P, P', S, S', in which the parameters are defined as follows: P: volume identifier, cylinder number and head number of starting track in extent cylinder number and head number of ending track in extent P': volume identifier S: subsystem serial number, subsystem identifier, volume identifier cylinder number and head number of starting track in extent cylinder number and head number of ending track in extent S': volume identifier.

The command gets the tracks identified by P:volume/extent and copies them to P':volume. It sends all the tracks in P' to the subsystem identified in S:serial number/subsystem id and to S:volume or S':volume if specified. If S' is used, then the tracks are copied from S':volume to S:extent.

The mechanism of the present invention uses a snapshot copy process to move data between volumes in a storage system. This snapshot copy process includes a dynamically mapped virtual data storage system. This system stores data files received from a processor in back-end data storage devices by mapping the processor assigned data file identifier to a logical address that identifies the physical storage location of the data. This dynamically mapped virtual data storage system performs a copy of a data file by creating a duplicate data file pointer to a data file identifier in a mapping table to reference the original data file. In this dynamically mapped virtual data storage system, the data files are referred to as a collection of "virtual tracks" and each data file is identified by unique virtual track addresses (VTAs). The use of a mapping table provides the opportunity to replace the process of copying the entirety of a data file in the data storage devices with a process that manipulates the contents of the mapping table. A data file appears to have been copied if the name used to identify the original data file and the name used to identify the copy data file are both mapped to the same physical data storage location.

This mechanism enables the processor to access the data file via two virtual track addresses while only a single physical copy of the data file resides on the back-end data storage devices in the data storage system. This process minimizes the time required to execute the copy operation and the amount of memory used since the copy operation is carried out by creating a new pointer to the original data file and does not require any copying of the data file itself. More information on snapshot copy processes may be found in U.S. Pat. No. 06,038,639, entitled Data File Storage Management System for Snapshot Copy Operations, which is incorporated herein by reference.

Figure 3:
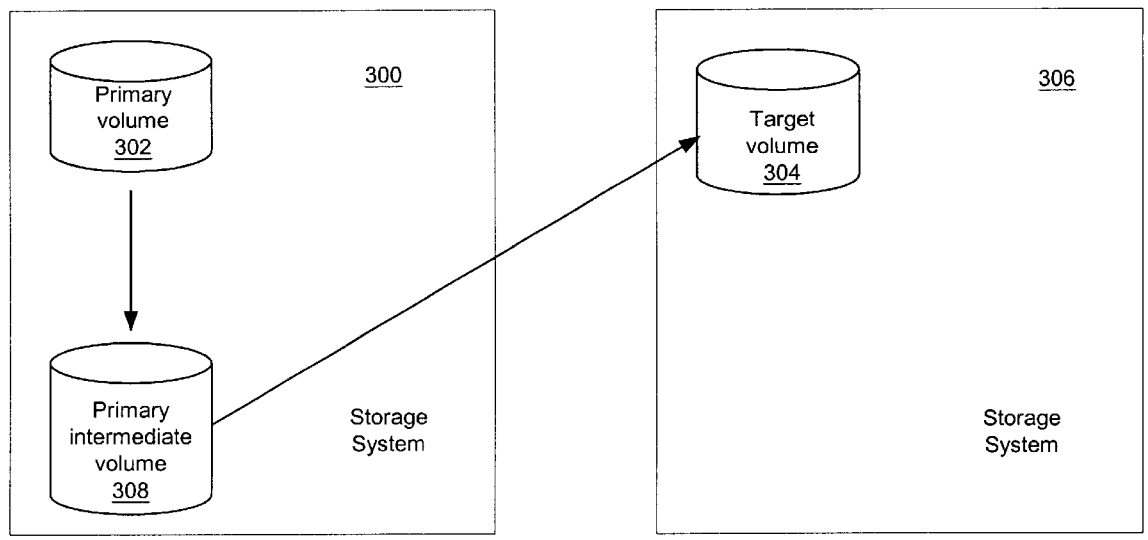
FIG. 3 is a diagram illustrating data flow for a global snap command in accordance with a preferred embodiment of the present invention.

With reference now to FIG. 3, a diagram illustrating data flow for a global snap command is depicted in accordance with a preferred embodiment of the present invention. In this example, the global snap command does not use the optional S' parameter.

When the global snap command is received in storage system 300, the command identifies data in primary volume 302 to be transferred to target volume 304 in storage system 306. In response to the command, a PPRC pair is established between target volume 304 and primary intermediate volume 308. In this example, the data is transferred to primary intermediate volume 308 using an internal snap, which is a snap copy process. After the data is transferred to primary intermediate volume 308, a PPRC copy from primary intermediate volume 308 is made to target volume 304. After the data is transferred, the PPRC pair between primary intermediate volume 308 and target volume 304 is terminated. The internal snap copy from primary volume 302 to primary intermediate volume 308 frees up primary volume 302 for other uses.

Figure 4:
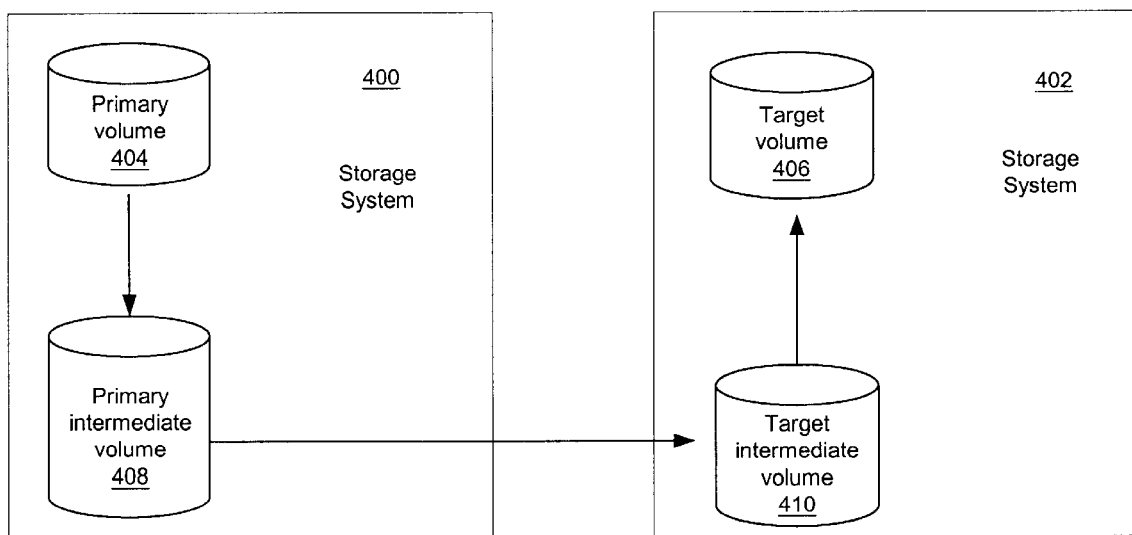
FIG. 4 is a diagram illustrating data flow using two intermediate volumes in response to a global snap command in accordance with a preferred embodiment of the present invention.

Turning next to FIG. 4, a diagram illustrating data flow using two intermediate volumes in response to a global snap command is depicted in accordance with a preferred embodiment of the present invention. In this example, the global snap command includes the parameter S', designating an intermediate volume in the target storage system.

In this example, data is to be transferred from storage system 400 to storage system 402. In particular, data is to be copied from primary volume 404 to target volume 406. This example involves the use of primary intermediate volume 408 and a target intermediate volume 410. In response to receiving a global snap command, a volume pair is established between primary intermediate volume 408 and target intermediate volume 410. An internal snap copy occurs from primary volume 404 to primary intermediate volume 408. This snap copy operation frees up primary volume 404 for other uses. The data is then copied from primary intermediate volume 408 to target intermediate volume 410 using a PPRC copy operation.

Another internal snap copy operation occurs to transfer data from target intermediate volume 410 to target volume 406. This snap copy operation allows target volume 406 to remain online and avoids overwriting the entire target volume. After the copy has concluded, then the PPRC pair between primary intermediate volume 408 and target intermediate volume 410 is terminated. The global copy operation also includes returning the results to the source storage system, storage system 400. This information is used to determine whether the operation has been completed and whether the operation was successful.

The examples illustrated in FIGS. 3 and 4 involve copying data between different volumes on devices in the storage subsystems. In these examples, a volume is the information stored in a media, virtual and/or physical.

Figure 5:
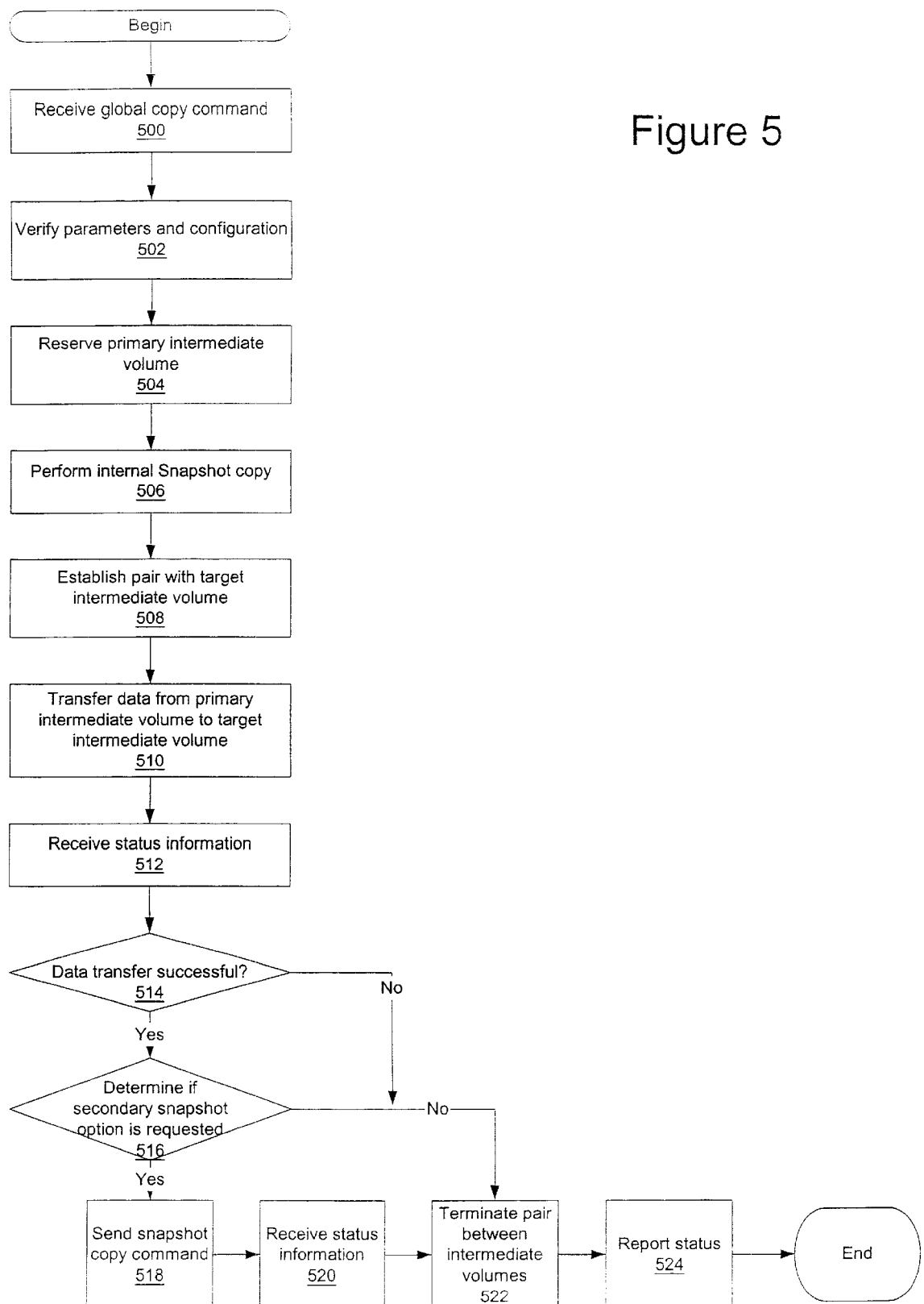
FIG. 5 is a flowchart of a process used for transferring data from a source storage system in accordance with a preferred embodiment of the present invention.

Turning next to FIG. 5, a flowchart of a process used for transferring data from a source storage system is depicted in accordance with a preferred embodiment of the present invention. The process illustrated in FIG. 5 may be implemented in a source storage system. This source storage system may take the form of storage system 200 in FIG. 2. In FIG. 4, an entire volume is copied. In this example, only a portion of a volume may be copied. Normally, PPRC operations copy entire volumes. To avoid overwriting the entire target volume, intermediate volumes are used to copy data between storage subsystems and the desired data is copied from an intermediate volume on the target storage system to the target volume using a snap copy operation. As a result, using a second intermediate volume allows for this type of copying without overwriting the entire target volume. Alternatively, the data may be transferred directly from the secondary intermediate volume to the target volume directly without using an intermediate volume on the target storage system.

The process begins by receiving a global copy command (step 500). In the depicted examples, this copy command includes the parameters P, P', S, and optionally S' as described above. The parameters and configuration are verified (step 502). This verification ensures that the parameters are for valid volumes and data locations. The verification of the configuration ensures that the path, the subsystem, and the device are present and available for processing the command. An internal snapshot copy operation is performed (step 506). This snapshot copy operation transfers the data from the primary volume to the primary intermediate volume. A pair is established between the primary intermediate volume on the source storage system and a target intermediate volume on the target storage system (step 508). This target intermediate volume may or may not be the final target volume for the data being copied. This situation is determined based on the global copy command and whether an intermediate volume on the target storage system is designated. Data is then transferred from the primary intermediate volume to the target intermediate volume (step 510).

Status information is then received (step 512). Based on the status information, a determination is made as to whether the data transfer was successful (step 514). A determination is made as to whether a secondary snap option is requested (step 516). This determination is made by examining the global copy command to see whether a parameter S' has been included. If a secondary snap option is requested in the global copy command, then a global snapshot copy command is sent to the target storage system (step 518). The information in the global snapshot copy command includes the source volume extent and the target volume extent. Status information is then received (step 520). Then, the pair between the intermediate volumes are terminated (step 522). Step 522 includes sending a command to the target storage system to terminate the pair between the intermediate volumes.

The status of the copy operation is then reported (step 524) with the process terminating thereafter. This status information may merely be an indication that the data has reached the destination or target volume. If a failure in the operation has occurred, error codes or other details may be reported to the user or to an error handler.

With reference again to step 516, if a secondary snap option is not requested in the global copy command, the process proceeds directly to step 522 to terminate the pair between the intermediate volumes. Referring back to step 514, if the data transfer is not successful, the process also proceeds to step 522.

Figure 6:
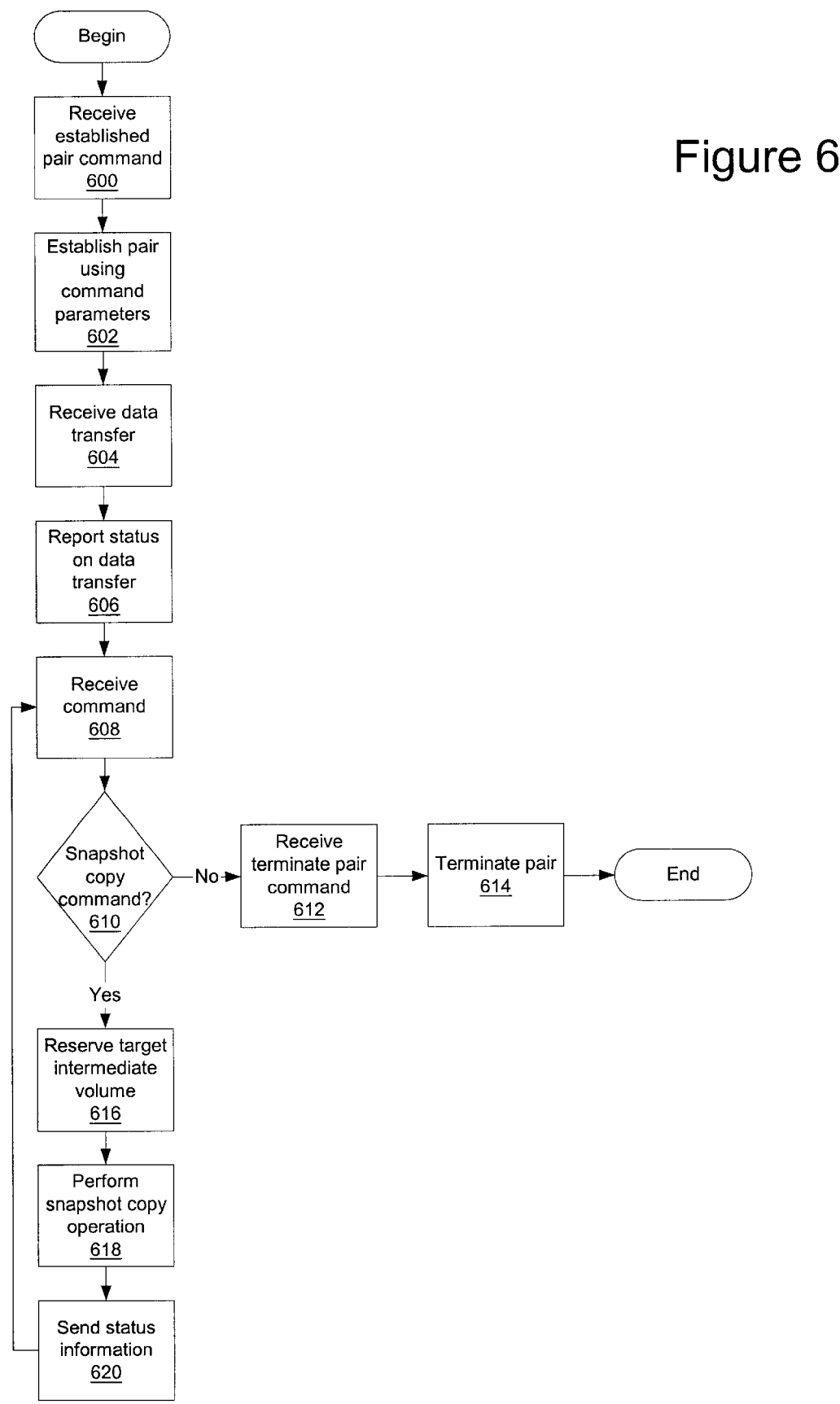
FIG. 6 is a flowchart of a process used for receiving data in response to a global copy command in accordance with a preferred embodiment of the present invention.

With reference now to FIG. 6, a flowchart of a process used for receiving data in response to a global copy command is depicted in accordance with a preferred embodiment of the present invention. The process illustrated in FIG. 6 is implemented in a target storage system, which may take the form of storage system 200 in FIG. 2.

The process begins by receiving an established pair command (step 600). A pair is established between the primary intermediate volume in the source storage system and the secondary intermediate volume in the target storage system (step 602). Data is then received from the source storage system using the pair of volumes (step 604). A status of the data transfer is then reported (step 606). This report is sent to the source storage system to indicate whether the data transfer was successful. A command is then received (step 608). A determination is made as to whether this command is a snapshot copy command (step 610). If the command is not a snapshot copy command, it is assumed that a terminate pair command has been received (step 612). The pair is then terminated (step 614) with the process terminating thereafter.

With reference again to step 610, if the command is a snapshot copy command, then a target intermediate volume is reserved (step 616). Next, a snapshot copy operation is performed (step 618). Status information is then returned to the source storage system (step 620) with the process then returning to step 608 as described above.

Thus, the present invention provides an improved method, apparatus, and computer implemented instructions for copying information from one storage system to another storage system. The mechanism of the present invention allows for copying data while reducing user actions needed to copy the data and to reduce resource usage. When a global copy command is received, a pair between volumes on the source storage system and the target storage system are automatically established. A snap copy operation is performed in the source storage system to transfer data to an intermediate volume, which frees up the source volume for use. The data is copied to the target storage system to a corresponding volume in the established pair. This established pair may be the final target or destination or may be an intermediate volume which another snap copy operation is performed to transfer the data to the final destination. This second snap copy operation is employed to free up the target volume during the actual copying of data from the source storage system to the target storage system. Additionally, this second snap copy operation is used when the entire volume is not to be overwritten. In this manner, advantages of snapshot copy operations and PPRC copy operations may be achieved without requiring the overhead involving user interaction and system resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the volumes illustrated above are described as virtual volumes, the processes of the present invention also may be applied to physical volumes. Additionally, the illustrated examples use snap copy operations to transfer data to an intermediate volume for copying. Any other mechanism that transfers data to an intermediate volume may be used in place of a snap copy operation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for copying data, the method comprising:

receiving a request to copy data from a first storage device to a second storage device, wherein the request identifies a source volume on the first storage device and a target volume on the second storage device and wherein data is located on a first source volume in the first storage device;

transferring the data from the source volume to a second source volume in the first storage device;

establishing a pair between the second source volume and the target volume;

copying the data for the request from the second source volume to the target volume after the pair has been established; and terminating the pair after the data has been copied to the target volume.

2. The method of claim 1, wherein the step of establishing a pair between the second source volume and the target volume comprises establishing a pair between the second source volume and an intermediate target volume wherein the step of copying data from the second source volume comprises copying the data from the second source volume to the intermediate target volume, wherein an internal copy operation from the intermediate target volume to the target volume occurs after the data has been copied from the second source volume to the intermediate target volume.

3. The method of claim 1, wherein the target volume is an intermediate target volume and wherein the data is transferred from the intermediate target volume to a final target volume.

4. The method of claim 3, wherein the request includes a designation of the final target volume.

5. The method of claim 1 further comprising:

receiving results after the data has been copied, prior to terminating the pair.

6. The method of claim 5, wherein the results indicate whether the data has been successfully copied.

7. The method of claim 2, wherein the step of copying data from the intermediate target volume to the target volume is accomplished using a snap copy operation.

8. The method of claim 1, wherein the step of transferring the data to the second source volume is accomplished using a snap copy operation.

9. A method in a data processing system for copying data, the method comprising:

receiving a request to copy the data from a first storage device to a second storage device, wherein the request includes a source volume on the first storage device and a target volume on the second storage device and wherein data is located on a first source volume in the first storage device;

in response to receiving the request, performing a snapshot copy operation of the data to from the source volume to an intermediate source volume on the first storage device;

establishing a pair between the intermediate source volume and the target volume; and copying the data from the intermediate source volume to the target volume.

10. The method of claim 9 further comprising:

terminating the pair after the data has been copied from the intermediate source volume to the target volume.

11. A storage device comprising:

a plurality of volumes;

an interface; and a controller, wherein the controller has a plurality of modes of operation including:

a first mode of operation in which the controller monitors the interface for a request to copy data to another storage device;

a second mode of operation, responsive to detecting the request, in which the controller performs a copy operation of the data from a source volume within the plurality of volumes to an intermediate source volume within the plurality of volumes on the storage device; and a third mode of operation in which the controller establishes a pair between the intermediate source volume and a target volume for the data in the another storage device; and a fourth mode of operation in which the controller copies the data from the intermediate source volume to the target volume on the another storage device.

12. The storage device of claim 11 further comprising:

a fifth mode of operation in which the controller terminates the pair between the intermediate source volume and the target volume.

13. The storage device of claim 11, wherein the copy operation performed in the second mode of operation is a snap copy operation.

14. A data processing system comprising:

a network;

a primary storage device including:
a plurality of storage volumes; and
an interface connected to the network;

a secondary storage device including:
a plurality of storage volumes; and
an interface connected to the network; and a host computer, wherein the primary storage device receives a request to a request to copy data in the primary storage device to another storage device, the primary storage device performs a copy operation of the data to from a source volume within the plurality of volumes in the primary storage device to an intermediate source volume within the plurality of volumes in the primary storage device in response to receiving the request; the primary storage device establishes a pair between the intermediate source volume in the primary storage device and a target volume within the plurality of volumes in the secondary storage device for the data, and primary storage device copies the data from the intermediate source volume in the primary storage device to the target volume in the secondary storage device.

15. The data processing system of claim 14, wherein the network is a wide area network.

16. The data processing system of claim 14, wherein the network is an enterprise systems connection ESCON communications path.

17. The data processing system of claim 14, wherein the network is a local area network.

18. A data processing system for copying data, the data processing system comprising:

receiving means receiving a request to copy data from a first storage device to a second storage device, wherein the request identifies a source volume on the first storage device and a target volume on the second storage device and wherein data is located on a first source volume in the first storage device;

transferring means transferring the data from the source volume to a second source volume in the first storage device;

establishing means establishing a pair between the second source volume and the target volume;

copying means copying the data for the request from the second source volume to the target volume after the pair has been established; and terminating means terminating the pair after the data has been copied to the target volume.

19. The data processing system of claim 18, wherein the establishing means: comprises establishing means for establishing a pair between the second source volume and an intermediate target volume wherein the step of copying data from the second source volume; and copying means for the data from the second source volume to the intermediate target volume, wherein an internal copy operation from the intermediate target volume to the target volume occurs after the data has been copied from the second source volume to the intermediate target volume.

20. The data processing system of claim 18, wherein the target volume is an intermediate target volume and wherein the data is transferred from the intermediate target volume to a final target volume.

21. The data processing system of claim 20, wherein the request includes a designation of the final target volume.

22. The data processing system of claim 18 further comprising:

receiving means receiving results after the data has been copied, prior to terminating the pair.

23. The data processing system of claim 22, wherein the results indicate whether the data has been successfully copied.

24. The data processing system of claim 19, wherein the step of copying data from the intermediate target volume to the target volume is accomplished using a snap copy operation.

25. The data processing system of claim 18, wherein the step of transferring the data to the second source volume is accomplished using a snap copy operation.

26. A data processing system in a data processing system for copying data, the data processing system comprising:

receiving means receiving a request to copy the data from a first storage device to a second storage device, wherein the request includes a source volume on the first storage device and a target volume on the second storage device and wherein data is located on a first source volume in the first storage device;

performing means, in response to receiving the request, performing a snapshot copy operation of the data to from the source volume to an intermediate source volume on the first storage device;

establishing means establishing a pair between the intermediate source volume and the target volume; and copying means copying the data from the intermediate source volume to the target volume.

27. The data processing system of claim 26 further comprising:

terminating means terminating the pair after the data has been copied from the intermediate source volume to the target volume.

28. A computer program product in a computer readable medium for use in a data processing system for copying data, the computer program product comprising:

first instructions for receiving a request to copy data from a first storage device to a second storage device, wherein the request identifies a source volume on the first storage device and a target volume on the second storage device and wherein data is located on a first source volume in the first storage device;

second instructions for transferring the data to a second source volume in the first storage device;

third instructions for establishing a pair between the second source volume and the target volume;

fourth instructions for copying the data for the request from the second source volume to the target volume after the pair has been established; and fifth instructions for terminating the pair after the data has been copied to the target volume.

29. A computer program product in a computer readable medium for use in a data processing system for copying data, the computer program product comprising:

first instructions for receiving a request to copy the data from a first storage device to a second storage device, wherein the request includes a source volume on the first storage device and a target volume on the second storage device and wherein data is located on a first source volume in the first storage device;

second instructions for a response to receiving the request, performing a snapshot copy operation of the data to from the source volume to an intermediate source volume on the first storage device;

third instructions for establishing a pair between the intermediate source volume and the target volume; and fourth instructions for copying the data from the intermediate source volume to the target volume.

* * * * *